(12) United States Patent
Nie et al.

(10) Patent No.: US 7,713,045 B2
(45) Date of Patent: May 11, 2010

(54) INJECTION APPARATUS FOR PRODUCING MOLDED FOOD PRODUCTS

(75) Inventors: Li Nie, Parkville, MO (US); Michael Douglas Parker, Lawrence, KS (US); Sukh D. Bassi, Atchison, KS (US); Clodualdo C. Maningat, Platte City, MO (US)

(73) Assignee: Sergeant's Pet Care Products Inc., Omaha, NE (US)

( * ) Notice: Subject to any disclaimer, the term of this patent is extended or adjusted under 35 U.S.C. 154(b) by 850 days.

(21) Appl. No.: 11/340,781

(22) Filed: Jan. 26, 2006

(65) Prior Publication Data

US 2006/0191423 A1    Aug. 31, 2006

Related U.S. Application Data

(60) Provisional application No. 60/647,250, filed on Jan. 26, 2005.

(51) Int. Cl.
*B29C 45/02* (2006.01)

(52) U.S. Cl. .......... 425/130; 425/557; 425/562
(58) Field of Classification Search .......... 425/562, 425/564, 566, 568, 572, 588, 130, 557
See application file for complete search history.

(56) References Cited

U.S. PATENT DOCUMENTS

| | | | | |
|---|---|---|---|---|
| 2,418,856 | A * | 4/1947 | Stacy | 425/130 |
| 3,417,433 | A * | 12/1968 | Teraoka | 425/559 |
| 3,599,677 | A * | 8/1971 | O'Brien | 138/122 |
| 4,267,132 | A * | 5/1981 | Henderson et al. | 264/3.3 |
| 4,683,128 | A * | 7/1987 | Orii et al. | 423/338 |
| 5,891,381 | A * | 4/1999 | Bemis et al. | 425/130 |
| 7,195,472 | B2 * | 3/2007 | John | 425/89 |

FOREIGN PATENT DOCUMENTS

GB            2332850            7/1999

* cited by examiner

*Primary Examiner*—Tim Heitbrink
(74) *Attorney, Agent, or Firm*—Polsinelli Shughart PC

(57) ABSTRACT

An extrusion-based injection molding system is designed for use in food processing applications. Interior surfaces, such as the barrel exit line and/or fill line, of the system may be coated with a friction-reducing agent.

18 Claims, 2 Drawing Sheets

INJECTION APPARATUS FOR PRODUCING MOLDED FOOD PRODUCTS

RELATED APPLICATIONS

This application claims priority to U.S. Application No. 60/647,250, filed Jan. 26, 2005, which is incorporated herein by reference.

BACKGROUND

1. Field of the Invention

The present invention pertains to combined extrusion and injection processing systems that convert powder and liquid mixtures into molded products. More particularly, the combined extrusion and injection processing systems are used to make molded food products.

2. Description of the Related Art

Extrusion systems that are used in the plastics industry commonly operate on stable plastic pellets that are fed into the screw or screws in the extruder barrel. The turning screws typically shear and heat the pellets, along with other materials, to form a modified plastic in melt form, which is forced through a die to form a wide variety of plastic products, including materials for use in injection molding. In the case of plastics, injection molding is accomplished by injecting plastic into a mold and subjecting it to heat and pressure, thereby producing a plastic object that mirrors the shape of the mold.

Extrusion and injection molding are commonly carried out in different machines at different times. However, there exists a class of unitary machines that perform extrusion and injection molding in one pass. The extrusion section of the machine takes in plastic pellets, and optional compounds if desired, melts them by the shearing and heating action of the screws, and feeds the resultant melt directly into the receiving facility of the injection-molding section of the machine. The melt is then injected into a mold pursuant to the usual procedures and formed into a desired shape.

In the plastics industry, the pelletized feed source is generally prepared in a separate extrusion process, either with or without compounding. This two-step process allows for the production of plastic pellets by a chemical company or compounders, who may supply the pellets to a manufacturer of plastic products. Relatively speaking, the pellets are chemically and physically stable. They are eminently suitable for use in conventional injection molding machines.

This is rarely true for most food products. First, it is not always possible to make pellets that can be easily handled for later injection molding. Second, where pellets can be made, they are not typically chemically or physically stable. Among other things, they age and dry out. Care must be taken in their packaging, storage environment and transportation, both to and on site. Failure to do so can render the pellets difficult or impossible to melt in an extruder. Beyond this, food pellets are sensitive to even small deviations in extrusion conditions. For example, the amount of liquid in the formulation may be such that the pellets either do not form cohesively or form into a monolithic mass that is difficult to process. Excessive pressures develop in the extruder, and the food mixture can be easily overworked. In short, pelletizing of foods, especially foods containing flour or starch, is usually not practical or cost effective.

The problems discussed above with reference to pelletized feeds, as well as the formation of excessive pressures and overworking of food ingredients, significantly if not completely limits the utility of unitary extrusion-molding systems in the food industry. This is disappointment in view of the benefits offered by these systems in other industries, including the plastics industries.

SUMMARY

The present instrumentalities advance the art and overcome the problems outlined above by providing extrusion-based injection molding systems and methods for use in food processing applications.

In one aspect, the invention comprises a system for sequential extrusion and molding of food comprising the following: apparatus for extruding food having a food extrusion exit line; apparatus for injection molding food having an food injection inlet line; a piston joining the food extrusion exit line and the food injection inlet line; and a valve positioned on the food injection inlet line. At least one surface of the apparatus for extruding food and the apparatus for injection molding food is coated with a friction-reducing agent.

In another aspect, the invention comprises a system for sequential extrusion and molding of food comprising the following: apparatus for extruding food having a food extrusion exit line; apparatus for injection molding food having an food injection inlet line; a piston joining the food extrusion exit line and the food injection inlet line, the piston sequentially receiving food from the food extrusion exit line and expelling food through the food injection injector inlet line; and a valve positioned on the food injection inlet line, the valve being closed when the piston is receiving food, and open when the piston is expelling food. At least one surface of the apparatus for extruding food and the apparatus for injection molding food is coated with a friction-reducing agent.

In yet another aspect, the invention comprises a method of injection molding comprising the following steps: linking an extrusion apparatus and an injection molding apparatus to form a system for sequential extrusion and molding; coating one or more interior surfaces of the system with a friction-reducing agent to facilitate movement of food through the system; subjecting food to extrusion by the extrusion apparatus; transferring food from the extrusion apparatus to the injection molding apparatus; and injection molding the food to produce food products.

DETAILED DESCRIPTION

In one embodiment, an extrusion-based injection molding system is used for injection molding of food products. Interior surfaces of the system are coated with a friction-reducing agent to reduce head pressure in a manner that facilitates use of the system for food processing applications. In particular, coating of the barrel exit line and/or fill line with a friction-reducing agent facilitates production of food products. Systems of this type may operate on pelletized or non-pelletized feeds, without degrading the ultimate product. Exemplary food products that may be made using the systems and methods described herein include biscuits, cookies, pizza crusts and pet chews.

As used herein, the term "friction-reducing agent" refers to any permanent or semi-permanent material that may be adhesively applied to a surface of an extrusion-based injection molding system, where the friction-reducing agent has a lower coefficient of friction than the material forming the surface. Suitable friction-reducing agents include polytetrafluoroethylene (PTFE, sold as Teflon®, a registered trademark of E.I. DuPont DeNemours and Company, Delaware), perflouroalkoxy polymer resins (PFA), fluorinated ethylene propylene copolymers (FEP), ethylene and tetrafluoroethylene copolymers (ETFE, sold as Tefzel®, a registered trademark of E.I. DuPont DeNemours and Company, Delaware), nylon, ultra high molecular weigh polyethylene (UHMWPE), and polyoxymethylene. Friction reducing agents are preferably resistant to high temperatures, chemical reaction, corrosion, and stress-cracking.

Interior surfaces of systems described herein may be coated with one or more friction-reducing agents by a variety of known methods. For example, the friction-reducing agent may be painted, sprayed, powder coated, or otherwise contacted with the surface. If necessary, friction-reducing agents may be cured, e.g., by heat treating or by contact with a suitable cross-linking agent.

Interior surfaces of system components, particularly pipes, barrels and other cylindrical components, may also be "coated" by inserting into the component a pre-formed tube of a friction-reducing agent. The tube will ideally have an outer diameter that is substantially the same as the inner diameter of the system component. An adhesive may optionally be applied between the tube and the component, to limit or prevent movement of the tube within the component. The tube and component may also be heated in order to soften the tube and mold it to conform to the shape of the component. The tube may be made entirely or partially of a friction-reducing agent, so long as the inner diameter of the tube includes the friction-reducing agent. Although reference has been made to cylindrical components, it will be appreciated that pre-formed "tubes" may be used in conjunction with square, rectangular or irregularly shaped components. Suitable tubes may be formed, for example, of Teflon® or polyethylene.

Figure 1:
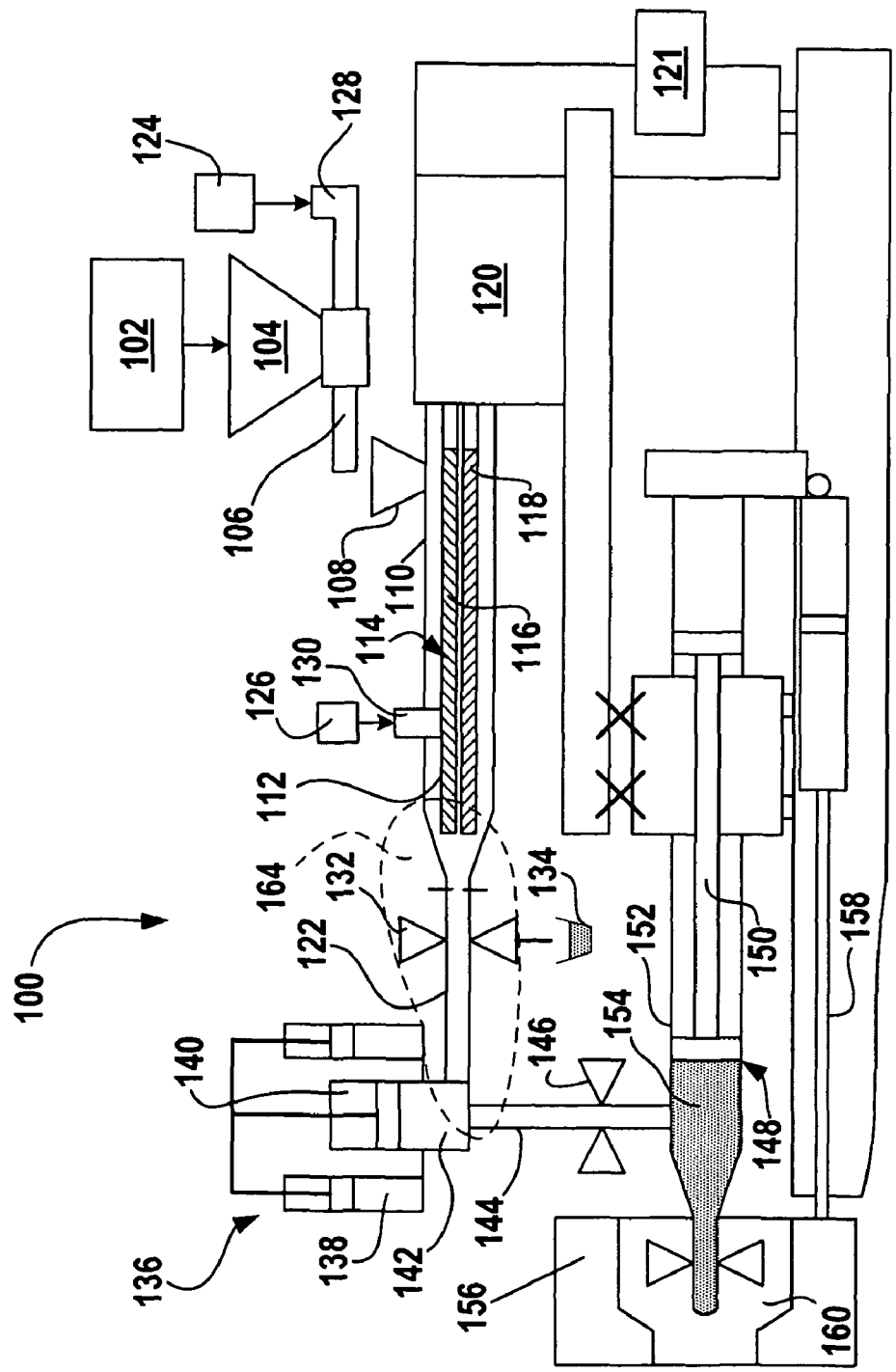
FIG. 1 shows a partial sectional side view of an extrusion-based injection molding system.

FIG. 1 shows a partial sectional side view of an extrusion-based injection molding system 100. A non-pelletized feed 102 is submitted to hopper 104. The feed may, for example, be a mixture of dry flour, starch and/or protein together with additional ingredients for use in making a food product. Hopper 104 discharges through line 106 into barrel fed opening 108, through which the feed 102 enters extruder barrel 110. As shown in FIG. 1, the side portion of extruder barrel 110 is removed for a midsectional view revealing an interior chamber 112 that contains a twin screw assembly 114 including opposed elongate screw elements 116, 118. Housing 120 includes a motive drive mechanism (such as gears, not shown) for synchronous turning of the twin screw assembly 114 by the action of motor 121. This turning of the twin screw assembly 114 mixes, shears, and heats the feed 102 as flow progresses towards an extruder barrel exit line 122. Liquid ingredients 124, 126, such as water or glycerine, may be added through ancillary hopper line 128 or barrel injector port 130. The barrel exit line 122 contains a startup valve 132 that may be selectively opened and closed to drain waste or product sample material 134.

The barrel exit line 122 discharges into buffer assembly 136, which is formed of a pneumatic or hydraulic actuator 138 driving piston 140 for the synchronously controlled selective filling and discharge of material within buffer chamber 142. Piston 140 is retracted upwards in fill mode and pushed downward in discharge mode. Buffer chamber 142 discharges into fill line 144, which is provided with an electronically or pneumatically controlled two-way valve 146 that is used to either prevent or permit flow through fill line 144.

Fill line 144 feeds an injection molding assembly 148. The injection molding assembly includes a hydraulically actuated piston 150 within cylinder 152. Piston 150 may operate in a receive mode and an injection mode. In receive mode, material 154 is synchronously received from fill line 144 ahead of piston 150 when piston 150 is retracting, two way valve 146 is open, and piston 140 is in discharge mode. Injection mode occurs when the piston 150 is advancing to fill an injection mold 156. During injection mode, two-way valve 146 is closed, piston 140 is in fill mode, and piston 150 is advancing to force material 154 into the injection mold 156. The synchronicity of operation between the different operational modes of pistons 140, 150, as described above, permits continuous operation of the twin screw assembly 114 and the continuous application of feed 102 into hopper 104 through any number of injection molding cycles in which the injection mold 156 is filled and emptied.

Thermal heating means (not shown), such as a heating coil, may be utilized to maintain a substantially constant temperature of material in barrel exit line 122, the buffer assembly 136, and the injection molding assembly 148. A hydraulic (or pneumatic) drive system governs the synchronous operation of piston 150.

The injection mold 156 may be any type of mold that can be used to make a molded product. Generally, injection mold 156 may be closed for the receipt and cooling/heating of material 154 and opened for the discharge of a molded product (not shown) upon specified cooling/heating.

Figure 2:
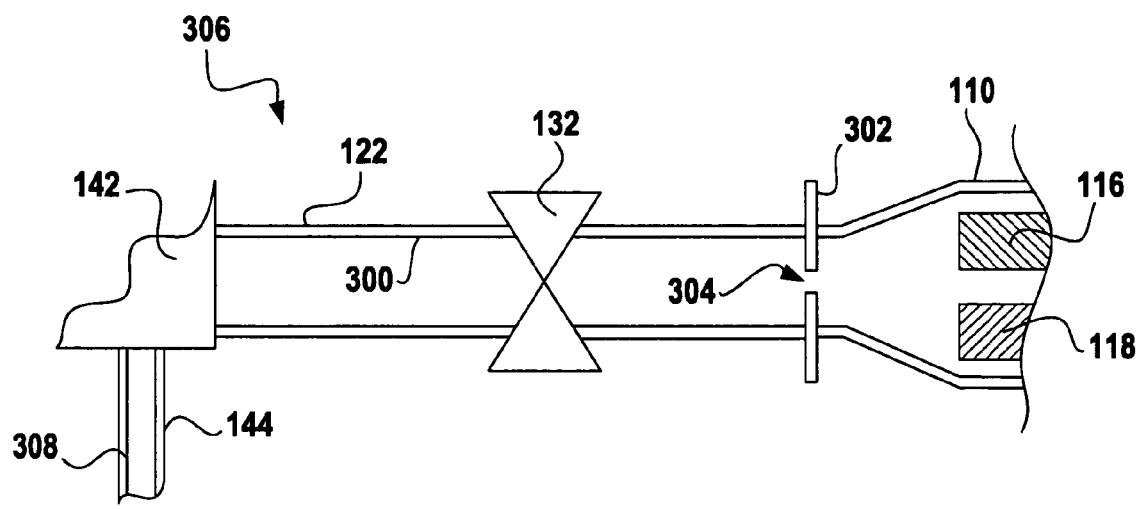
FIG. 2 is a midsectional view of a portion of the extrusion-based injection molding system of FIG. 1 showing interior surfaces that are coated with a friction-reducing agent, according to an embodiment.

The extrusion-based injection molding system 100 is shown with exemplary detail in FIG. 2, which is a midsectional view generally illustrating region 164 of FIG. 1. One or more of interior surfaces 300, 308 of system 100 is coated with a friction-reducing agent to reduce friction within the system 100 and, consequently, backpressure on screws 116 and 118. A die 302 is provided with different sizes of orifice 304 to further control system backpressure. The use of a friction-reducing agent on one or more of surfaces 300, 308 reduces excessive pressure at head 306, which, otherwise, results in overworking of the melt.

In operation, the extrusion-based injection molding system 100 is used to process foods. In one method of operation, feed 102 is fed as a dry mixture to the twin screw assembly 114. A liquid 126, such as a glycerine and water solution, is fed through the barrel injector port 130. The action of twin screw assembly 114 mixes feed 102 with liquid 126 to create a melt. The melt is continuously pumped into the buffer chamber 142 at a temperature of about 70° C. During the receive mode or filling cycle of the injection molding assembly 148, piston 140 forces the melt (as material 154) from the buffer chamber 142 at extrusion pressure into the injection cylinder 152 ahead of piston 150. During injection mode, piston 150 pushes the melt in the injection cylinder 152 into the cavity 160 of injection mold 156. The melt material 154 in mold cavity 160 is cured at an elevated temperature, e.g., 120° C. to 150° C. for up to about one minute in the case of a protein pet chew product. The mold 156 opens and individual molded products are ejected. Mold 156 then closes for the next cycle. Injection mode continues until the cylinder 152 is sufficiently depleted of material 154, and then the receive mode commences for filling of cylinder 152 with the material in buffer chamber 142.

The following examples teach by way of illustration, and not by limitation, to illustrate preferred embodiments of what is claimed.

EXAMPLE 1

The following example shows ingredients that may be processed as described above to make a pet chew.

| Ingredient | Baker's Percent (By weight percentage of total dry ingredients) |
|---|---|
| Dry Ingredients | |
| Vital wheat gluten | 78.20 |
| Midsol ™ HWG 2009 (hydrolyzed wheat gluten) | 12 |
| Optimizer H-Base (chicken liver digest) | 4.0 |
| Glycerol monostearate | 2.25 |
| Magnesium stearate | 0.9 |
| Solk-floc 900 (cellulose fiber) | 2.5 |
| Sodium metabisulfite | 0.12 |
| Covi-OX T-90 (Antioxidant mix) | 0.03 |
| Total Dry Ingredients | 100 |
| Liquid Ingredients | |
| Glycerine | 25 |
| Water | 4.5 |
| Vegetable oil | 2.5 |
| Total Liquid Ingredients | 32 |

Additional formulations, process conditions, and end products may be found, for example, in U.S. Pat. No. 5,665,152 issued to Bassi et al., which is incorporated by reference to the same extent as though fully replicated herein.

EXAMPLE 2

The following example shows ingredients that may be processed as described above to make a thin wall pizza crust.

| Ingredient | Parts |
|---|---|
| Flour | 90 parts |
| Fibersym 70 (resistant starch) | 10 parts |
| Vital Wheat Gluten | 5 parts |
| Salt | 2.0 parts |
| Sugar | 1.0 part |
| Vegetable Oil | 4 parts |
| Calcium Propionate | 0.25 part |
| Water | 40 parts |

Thin wall pizza crust having a thickness of ³⁄₁₆" was prepared using the systems and methods disclosed herein. The barrel temperature was set at 45° C. to keep the melt below 60° C. The mold was kept at 240° C. Cooking inside the mold was set for 30 seconds. The entire injection molding cycle was complete in 45 seconds. Pizza crust with defined shape and cooked texture was made.

Changes may be made in the above systems and methods without departing from the subject matter described in the Summary and defined by the following claims. It should thus be noted that the matter contained in the above description should be interpreted as illustrative and not limiting.

All references cited are incorporated by reference herein.

We claim:

1. A system for sequential extrusion and molding of non-pelletized food, said system comprising:
apparatus for extruding non-pelletized food having a hopper for receiving dry food, an ancillary hopper line for receiving liquid ingredients, an extruder barrel, and a food extrusion exit line;
apparatus for injection molding food having a food injection inlet line;
a piston joining the food extrusion exit line and the food injection inlet line;
a valve positioned on the food injection inlet line;
wherein at least one surface of the apparatus for extruding food and the apparatus for injection molding food is coated with a friction-reducing agent.

2. The system of claim 1, wherein the friction-reducing agent is selected from the group consisting of polytetrafluoroethylene, perflouroalkoxy polymer resins, fluorinated ethylene propylene copolymers, ethylene and tetrafluoroethylene copolymers, nylon, ultra high molecular weight polyethylene, and polyoxymethylene.

3. The system of claim 1 wherein the friction-reducing agent comprises polytetrafluoroethylene.

4. The system of claim 1 wherein the friction-reducing agent is applied to at least one surface of the food extrusion exit line.

5. The system of claim 1 wherein the friction-reducing agent is applied to at least one surface of the food injection inlet line.

6. The system of claim 1 wherein the friction-reducing agent is applied to at least one surface of the food extrusion exit line and at least one surface of the food injection inlet line.

7. The system of claim 1, wherein the friction-reducing agent comprises a tube for insertion into a system component.

8. A system for sequential extrusion and molding of non-pelletized food, said system comprising:
apparatus for extruding non-pelletized food having a hopper for receiving dry food, an ancillary hopper line for receiving liquid ingredients, an extruder barrel, and a food extrusion exit line;
apparatus for injection molding food having a food injection inlet line;
a piston joining the food extrusion exit line and the food injection inlet line, the piston sequentially receiving food from the food extrusion exit line and expelling food through the food injection inlet line;
a valve positioned on the food injection inlet line, the valve being closed when the piston is receiving food, and open when the piston is expelling food;
wherein at least one surface of the apparatus for extruding food and the apparatus for injection molding food is coated with a friction-reducing agent.

9. The system of claim 8, wherein the friction-reducing agent is selected from the group consisting of polytetrafluoroethylene, perflouroalkoxy polymer resins, fluorinated ethylene propylene copolymers, ethylene and tetrafluoroethylene copolymers, nylon, ultra high molecular weight polyethylene, and polyoxymethylene.

10. The system of claim 8 wherein the friction-reducing agent comprises polytetrafluoroethylene.

11. The system of claim 8 wherein the friction-reducing agent comprises a perflouroalkoxy polymer resin.

12. The system of claim 8 wherein the friction-reducing agent comprises a fluorinated ethylene propylene copolymer.

13. The system of claim 1 wherein the friction-reducing agent comprises an ethylene tetrafluoroethylene copolymer.

14. The system of claim 8 wherein the friction-reducing agent is applied to at least one surface of a component of the system.

15. The system of claim 8 wherein the friction-reducing agent is applied to at least one surface of the food extrusion exit line.

16. The system of claim 8 wherein the friction-reducing agent is applied to at least one surface of the food injection inlet line.

17. The system of claim 1 wherein the friction-reducing agent is applied to at least one surface of the food extrusion exit line and at least one surface of the food injection inlet line.

18. The system of claim 1, wherein the friction-reducing agent comprises a tube for insertion into a system component.

* * * * *